July 3, 1951  E. G. MERCIER ET AL  2,559,509
INTERMITTENT MOVEMENT
Filed Jan. 28, 1948  2 Sheets-Sheet 1
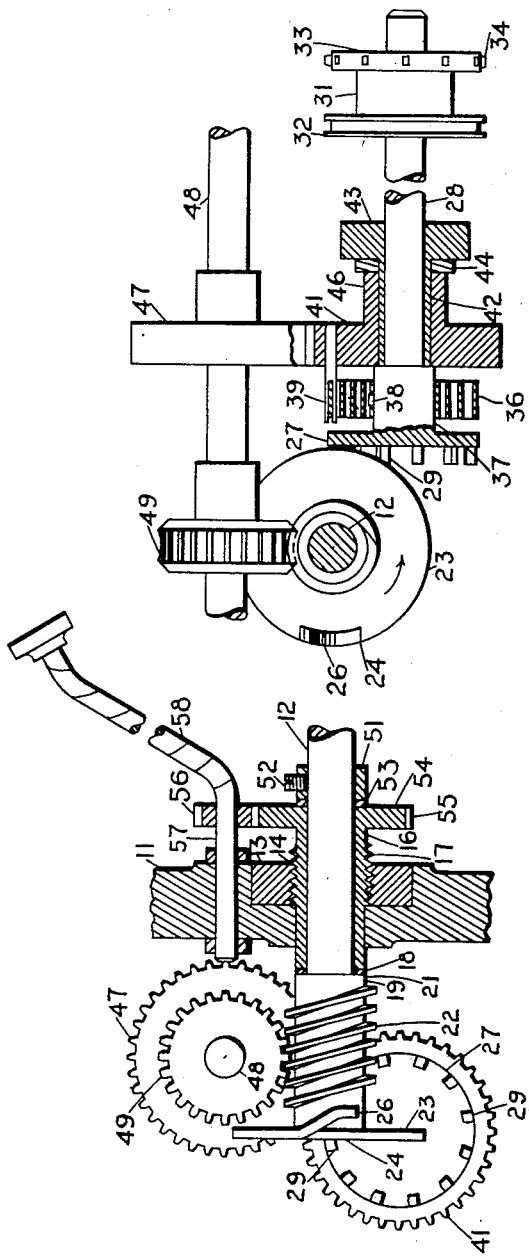
Inventor
EDWARD G. MERCIER
ARTHUR F. HAYEK
By
H. A. Mackey
Attorney July 3, 1951  E. G. MERCIER ET AL  2,559,509
INTERMITTENT MOVEMENT Filed Jan. 28, 1948  2 Sheets-Sheet 2

Inventor
EDWARD G. MERCIER
ARTHUR F. HAYEK
By H.A. Mackey
Attorney

Patented July 3, 1951

2,559,509

UNITED STATES PATENT OFFICE 2,559,509

INTERMITTENT MOVEMENT

Edward G. Mercier, Flushing, and Arthur F. Hayek, Pleasantville, N. Y., assignors to General Precision Laboratory Incorporated, a corporation of New York Application January 28, 1948, Serial No. 4,888

8 Claims. (Cl. 74—436)

This invention relates to an intermittent movement particularly adapted for use in motion picture projectors.

As is well understood in the art, motion pictures are projected by intermittently advancing a film strip past a projection aperture in such fashion that at the times that a light beam is projected therethrough the film is held stationary and at other times when the light beam is cut off by operation of a shutter mechanism, the film is rapidly moved to bring the next succeeding frame in proper relation with respect to the projection aperture.

It is the function of the intermittent movement to convert the continuous and uniform rotation of the driving mechanism to the intermittent actuation necessary to properly position and project the individual picture frames and since this action is quite rapid and is repeated 16 or more times a second, the intermittent movement must be of low inertia and capable of withstanding considerable wear without affecting its accuracy as a film positioning means.

It is one of the purposes of the present invention, therefore, to provide such a mechanism.

It is another purpose of the present invention to provide an intermittent movement which is simple and economical to manufacture and which at the same time is accurate in its operation of positioning the individual frames of the picture strip in correct relation to projection aperture to thereby produce a steady picture on the projection screen.

A still further purpose of the present invention is to provide an intermittent movement which incorporates easily accessible adjustment means so that the longitudinal position of the film strip may be varied to bring the individual picture frames in proper alignment with the projection aperture to properly "frame" the projected picture.

The exact nature of the invention will be more readily understood from the following description when taken together with the attached drawings, in which:

Figure 1 is a side view partly in section of the essential elements of the present invention.

Figure 2 is a front view likewise partly in section of the mechanism shown in Fig. 1.

Figure 3:
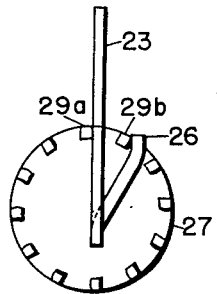
Figures 3, 4 and 5 are diagrammatic views illustrating the manner in which the star wheel and cam cooperate to index the film from one frame to the next succeeding frame.

Referring particularly to Figs. 1 and 2 a shaft 12 is journaled in a bushing 16 which in turn is fastened to a frame 11 for axial movement with respect thereto through the medium of external coarse screw threads 17 engaging the cooperating internal threads 14 of a member 13 rigidly fastened to the frame 11 by a press fit or other means whereby the member 13 is constrained from movement with respect thereto.

The shaft 12 is continuously rotated through the usual gearing and motor means (not shown) and has mounted thereon a member 19 which is firmly affixed to the shaft 12 by a press fit or the like. The member 19 includes a hub portion 21 on which is formed a worm gear 22 and a disc portion 23. The peripheral face of the disc portion is interrupted at 24 and has a portion 26 bent in a direction inclined to the face thereof so that the peripheral face of the disc portion 23 and the portion 26 constitutes a cam surface.

Cooperating with the cam surface of the disc portion 23, there is provided a star wheel 27 attached to a sprocket shaft 28 either by being made an integral part thereof or by some other suitable means. A number of teeth 29 are formed on one face of the star wheel extending at right angles thereto. The axis of the intermittent shaft 28 is disposed at right angles to the axis of the shaft 12 and these shafts are so positioned with respect to each other that one of the teeth 29 is always in engagement with and bears on the peripheral face of the disc 23.

While in the preferred forms disclosed herein, the shafts 28 and 12 are shown as being positioned at right angles with respect to each other, other angular relationships may also be utilized without departing from the spirit and scope of this invention. It is only necessary that there be no interference between the cam and star wheel.

At the same time the distance between the face of the disc portion 23 and the inner initial edge of the bent portion 26 is made equal to the distance between one face of a tooth 29 and the corresponding face of a next succeeding tooth. Hence as the shaft 12 and consequently the cam disc 23 is rotated in the direction of the arrow as indicated in Fig. 2, the star wheel 27 and its shaft 28 remain stationary as long as the flat portion of the disc 23 remains in contact with one of the star wheel teeth 29. When, however, the offset portion 26 is rotated to such a position as to engage one of the star wheel teeth 29, this tooth rides on the inner surface of the offset portion 26 and continued rotation of the shaft 12 and cam disc 23 causes the star wheel 27 and its associated shaft 28 to be rotated a partial revolution. In the example illustrated where twelve teeth are formed on the star wheel, the shaft 28 will of course, be rotated through an angle of 30° on each revolution of the shaft 12 and its associated cam disc 23.

Figure 4:
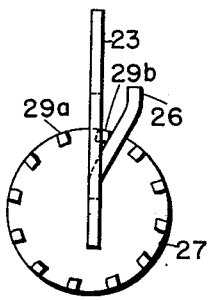
Figure 5:
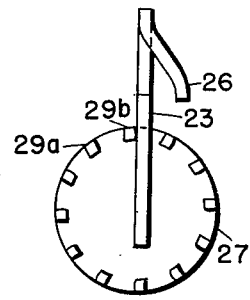

This partial and intermittent rotation or indexing of the star wheel is perhaps best illustrated in the diagrammatic views of Figs. 3, 4 and 5. In Fig. 3 there is illustrated the positional relationship of the star wheel 27 and cam disc 23 when the tooth 29b is first engaged by the offset portion 26. In this position the tooth 29a is still in engagement with the flat face of the disc 23 and although the tooth 29b has just been engaged by the offset portion 26 no movement of the star wheel 27 has as yet taken place.

In Fig. 4 there is illustrated the relationship of the parts when approximately half the indexing period has expired. As illustrated in this figure, the cam disc 23 has rotated to such an extent that the tooth 29b is engaged by the surface of the offset portion 26 some distance from its initial edge. The rotation of the disc 23 and the sliding action of the tooth 29b on the inner surface of the offset portion 26 has caused the tooth 29b to move to the left as viewed in this figure resulting in a partial rotation of the star wheel 27 and a movement of the tooth 29a away from the face of the disc 23.

Finally in Fig. 5 the relationship is depicted in which the tooth 29b is riding on the flat face of the disc 23 and the star wheel 27 is in its stationary or dwell period.

It will be apparent that there is a relatively long dwell period as compared with the indexing period when the offset portion 26 engages one of the teeth 29 and hence the movement of the film from one frame to the next may be made as rapidly as the permissible tension placed thereon by such action will allow. Likewise the offset portion 26 may be so shaped as to vary the acceleration in any desired manner, i. e., sine wave acceleration and deceleration, uniform acceleration and deceleration or the like.

It is also of particular importance to note that only one side of any of the teeth 29 are engaged by the flat surface of disc 23 and the offset portion 26 and the critical distance between the flat surface of the disc 23 and the initial edge of the offset portion 26 is the distance between the corresponding engaging surfaces of successive teeth. When, therefore, wear occurs on the teeth 29, as it inevitably must in the ordinary use of any intermittent, this wear occurs on only one face of the teeth 29 and is equal on each tooth so that the critical distance from corresponding face to corresponding face remains the same. By this means, no backlash, play or other looseness which would destroy the initial accuracy of the mechanism develops despite the inevitable wearing of the parts.

Figure 6:
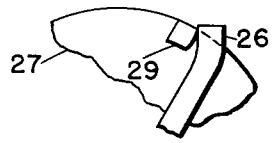
Figure 6 is an enlarged fragmentary view illustrating the form taken by the star wheel teeth and the manner in which a particular tooth cooperates with the indexing cam surface.

In Fig. 6 there is disclosed in an enlarged fragmentary illustration a more accurate representation of the form taken by the teeth 29. As indicated in this figure the wearing surface of the teeth 29 is rounded to provide line contact between the teeth 29 and the contact surfaces of the cam disc 23. Such a configuration insures uniform contact between the cam disc 23 and the star wheel teeth 29 at all times and prevents any sharp change in contact from one portion of the contact surface of a tooth to another as the mechanism proceeds through its indexing action thereby reducing wear and insuring quiet operation.

Recurring to Figs. 1 and 2, the shaft 28 intermittently rotated by action of the mechanism just described, has attached thereto for rotation therewith a sprocket 31 having flange portions 32 and 33. The flange portion 33 is provided with sprocket teeth 34 which engage the sprocket holes in the film strip and impart motion thereto and the flange portion 32 may be made with a supporting surface for the unperforated edge of 8 or 16 mm. film or may also be provided with sprocket teeth where the mechanism is used with larger sizes of film which are provided with perforations at both edges thereof.

As heretofore stated, care is taken that only one surface of the teeth 29 engage the surfaces of the cam disc 23 at any time to provide automatic compensation for wear without any inaccuracies or looseness of parts.

To insure that such contact will be maintained the invention provides a means whereby pressure is exerted at all times between one of the teeth 29 and the contact surfaces of the cam disc 23. In the form of the invention depicted in Figs. 1 and 2 this constant pressure is accomplished by use of a spiral spring 36 the inner end of which is fastened to a hub 37 formed on the shaft 28 through the medium of a pin 38. The outer end of the spring 36 is fastened to a pin 39 which in turn is driven into a spur gear 41.

The spur gear 41 is mounted on the shaft 28 for rotation with respect thereto through the medium of a bushing 42 having an enlarged end portion 43 cooperating with a thrust washer 44 acting as a thrust bearing for hub portion 46 formed on the gear 41. The bushing 42 is affixed to the shaft 28 and the bearing surface occurs between the gear 41 and the outer surface of the bushing 42 as well as between the end face of the hub 46 and the thrust washer 44.

The spur gear 41 engages a second spur gear 47 fastened to a shaft 48 in any convenient manner as by set screw, pinning and the like. Likewise affixed to the shaft 48 in a similar manner is a worm wheel 49 which is so positioned as to engage the worm 22 formed on the hub portion 21 of the member 19.

Initially the spring 36 is given a sufficient tension to maintain a selected star wheel tooth 29 in proper pressure contact with the cam surfaces of the cam disc 23. Considering for the moment that the gear 41 is held stationary while the star wheel 27, shaft 28 and sprocket 31 are intermittently rotated by the action of cam disc 23 and star wheel 27, it is apparent that progressively increasing tension would be placed on the spring 36 by the recurrent indexing of the star wheel 27.

It is the function of gears 41, 47, 49 and 22 and their associated elements to prevent unlimited increase in tension of the spring 36 and to always maintain the spring tension within the limits that are desirable for the proper operation of the mechanism.

As the shaft 12 is continuously rotated by the driving mechanism, the worm threads 22 rotate resulting in a slow rotation of the worm wheel 49 and the shaft 48 to which it is affixed. The spur gear 47 also affixed to the shaft 48 is likewise rotated resulting in rotation of the spur gear 41 in engagement with the gear 47. This rotation is such that the end of the spiral spring 36 which is attached to the gear 41 by the pin 39 is moved in a direction to decrease the tension of the spring.

It is apparent then that after the initial tension is introduced in the spring 36, this tension is gradually reduced by action of the gears 41, 47 and 49 as long as the shaft 28 is stationary, that is, one of the teeth 29 is in engagement with the flat face of the cam disc 23. As soon, however, as the off-set cam surface 26 engages a tooth 29 and the shaft 28 indexed or rotated a partial revolution, the shaft 28 is rotated in the same direction that the gear 41 is being rotated but at a much faster rate. This increases the tension on the spring 36 and by proper choice of gear ratios the tension may be restored to its original value at each indexing of the star wheel 27 and gradually reduced during the dwell period to a minimum value such that the tension is at all times maintained within suitable limits.

It will be obvious from the mechanism so far described, that a movement of the cam disc 23 in a direction axially with respect to the shaft 12 will produce a rotation of the shaft 28 and hence the sprocket 31 because of the spring tensioned engagement of one of the teeth 29 with the cam surfaces of the cam disc 23. Advantage is taken of this fact to provide a simple yet efficient mechanism for framing the picture with respect to the projection aperture.

When the film is threaded through the projector, the sprocket holes being engaged with the various sprocket teeth, the film may be so positioned that the edge of a picture frame does not coincide with the edge of the projection aperture. This produces the distracting effect of the projection of portions of each of two picture frames rather than the entire portion of just a single frame. When such misplacing of the film with respect to the aperture occurs, as is often the case, it is necessary to either move the film with respect to the aperture or the aperture with respect to the film. The former is much the better method and in the instant invention is very simple and conveniently accomplished.

The bushing 16 in which the shaft 12 rotates is in threaded engagement with a member 13 affixed to the frame 11 and rotation thereof will therefore cause the bushing to move axially with respect to the frame 11. The shaft 12 is constrained for axial movement with respect to the bushing 16 by a collar 51 fastened to the shaft 12 by a set screw 52. The collar 51 abuts against a thrust washer 53 which in turn engages one end of the bushing 16. The other end of bushing 16 abuts a similar thrust washer 18 which in turn contacts the member 19 affixed to the shaft 12 and conveying the cam disc 23.

Axial movement of the bushing 16, therefore, produces an equal movement of the shaft 12 which in turn is translated into a movement of the cam disc 23 and a consequent rotation of the shaft 28 through tensioned contact of a tooth 29 and the cam disc 23. One end of the bushing 16 is provided with a flange 54 on which are formed gear teeth 55 in engagement with the small spur gear mounted for rotational movement on a shaft 57 attached to the frame 11 in any desired manner. A flexible shaft 58 is attached to the gear 56 and the shaft and gear may be rotated by a knob 59 which by reason of the flexible connection may be mounted in any desired and advantageous position.

When, therefore, the gear 56 is rotated by actuation of the knob 59, the bushing is likewise rotated causing it to move into or out of the frame because of its threaded engagement therewith. This results as aforesaid in an axial movement of the shaft 12 which is likewise translated into a rotation of the shaft 28 and sprocket 31, which in turn will move the film strip in one direction or another to bring it into properly framed position.

While the shaft 12, to which the shutter (not shown) is attached, is moved by this operation in an axial direction the small amount of movement required for the framing operation does not affect the operation of the remainder of the apparatus, i. e., driving mechanism and the like.

Figure 7:
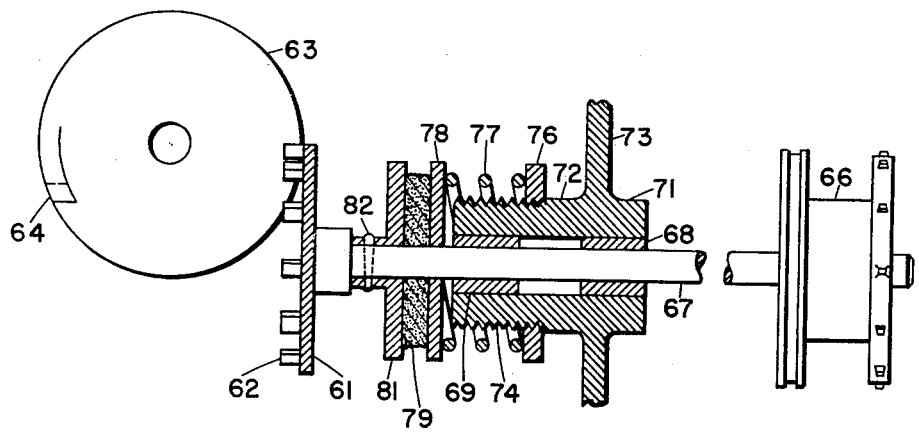
Figure 7 is a front view partly in section of a modified form of the invention.

As a somewhat simpler and almost equally efficient arrangement as the mechanism just described, the present invention contemplates the utilization of the modification disclosed in Fig. 7.

In the modification of Fig. 7 a star wheel 61 having teeth 62 and a cam disc 63 having the major portion of its circumference in the form of a flat face with an offset portion 64 are similar in all respects and operate in the same manner to index the star wheel 61 and film sprocket 66 as in the form described in connection with Figs. 1 and 2.

In this modification of the invention, however, instead of using a spring means to cause the contact faces of the star wheel teeth 62 to abut the cam surfaces of the cam disc 63, friction means is employed to accomplish this function.

The sprocket shaft 67 is mounted for rotational movement in bushings 68 and 69 inserted in bosses 71 and 72 provided on a frame 73. The boss 72 is threaded at 74 and provided with a cooperating nut 76 which bears against one end of a helical spring 77. Bearing against the other end of the spring 77 and loosely mounted on the shaft 67 is a plate 78. Adjacent thereto, but separated therefrom by a layer of friction material 79 is a second plate 81 constrained for rotational movement with the shaft 67 by being pinned thereto at 82. The plate 81 then rotates with the shaft 67 while the plate 78 is held stationary with respect thereto through the frictional engagement of the spring 77, and the amount of resistance imposed against rotation of the shaft 67 may be varied by increasing or decreasing the tension of the spring 77 by adjustment of the nut 76, thereby varying the pressure on the friction material interposed between the plates 78 and 81. By placing this retarding force on the shaft 67, the cam disc 63 in its operation of indexing the star wheel 61, its associated shaft 67 and sprocket wheel 66 must exert a pressure sufficient to overcome such force and this pressure is applied to the star wheel teeth 62 and constitutes a force which maintains a selected tooth in engagement with the cam surface of the cam disc 63. The variable frictional operation of the plates 78 and 81, therefore, function similarly to, and for similar purposes as, the spring tensioned mechanism of Figs. 1 and 2.

What is claimed is:

1. An intermittent movement comprising, an intermittent sprocket, a star wheel connected thereto, said star wheel having spaced teeth thereon, a continuously rotating cam wheel positively driving said star wheel having a uniformly circular portion and a curved portion offset therefrom, the distance from the leading edge surface of said offset portion and the surface of said circular portion being equal to the distance between corresponding surfaces on adjacent teeth, said cam wheel and said star wheel being disposed with their axes at an angle with respect to each other and with a selected star wheel tooth having only one surface thereof in engagement with the cam wheel and means for resisting the movement of said star wheel and for maintaining constant contact between a tooth surface and said cam wheel.

2. An intermittent movement comprising, an intermittent sprocket, a star wheel connected thereto, said star wheel having spaced teeth thereon extending at right angles from a side face thereof, a continuously rotating cam disc positively driving said star wheel having a flat face portion and a curved portion extending from said flat face portion in a direction inclined thereto, the maximum distance between the flat face portion and the surface of said curved portion being equal to the distance between corresponding surfaces on adjacent teeth, said cam disc and said star wheel being disposed with their axes at right angles with respect to each other and with a selected star wheel tooth having only one surface in engagement with said cam disc and means for resisting the movement of said star wheel and for maintaining constant contact between an engaged tooth surface and said cam wheel.

3. An intermittent movement comprising an intermittent sprocket, a star wheel connected thereto, said star wheel having spaced teeth thereon, a continuously rotating cam wheel positively driving said star wheel having a uniformly circular portion and a curved portion offset therefrom, the maximum distance between the surface of said offset portion and the surface of said circular portion being equal to the distance between corresponding surfaces on adjacent teeth, said cam wheel and said star wheel being disposed with their axes at an angle with respect to each other and with a selected star wheel tooth having only one surface in engagement with the cam wheel and friction means for resisting the movement of said star wheel and for maintaining constant contact between a tooth surface and said cam wheel.

4. An intermittent movement comprising an intermittent sprocket, a star wheel connected thereto, said star wheel having spaced teeth thereon, a continuously rotating cam wheel positively driving said star wheel having a uniformly circular portion and a curved portion offset therefrom, the maximum distance between the surface of said offset portion and the surface of said circular portion being equal to the distance between corresponding surfaces on adjacent teeth, said cam wheel and said star wheel being disposed with their axes at an angle with respect to each other and with a selected star wheel tooth having only one surface in engagement with the cam wheel and resilient means for resisting the movement of said star wheel and for maintaining constant contact between a tooth surface and said cam wheel.

5. An intermittent movement comprising a continuously rotating shaft, a cam wheel affixed to said shaft and rotated thereby, a star wheel attached to a second shaft having its axis disposed at an angle to the axis of said first mentioned shaft, said star wheel having uniformly spaced teeth adjacent to the edge thereof and extending at right angles thereto, said cam wheel having an interrupted rim portion and an offset portion disposed adjacent said interruption and extending from said rim portion in a curved path away from the plane of said rim portion, said rim portion and said offset portion contacting said star wheel teeth on only one side thereof, a spring having one end fastened to said star wheel and the other end fastened to a gear rotatably mounted on said second shaft, a second gear attached to and rotated by said cam wheel said first and second gears being operatively connected whereby rotation of said cam wheel reduces the tension applied to said spring and an intermittent sprocket attached to said second shaft and rotated thereby.

6. An intermittent movement comprising, a star wheel having teeth positioned in spaced relation about the periphery thereof, driving means positively and intermittently advancing said star wheel comprising a cam wheel having a straight portion and a curved portion, and means connected to said star wheel for resisting the movement thereof by said cam wheel whereby contact between said cam wheel and only a single surface of a selected star wheel tooth is insured.

7. An intermittent movement comprising, a star wheel having teeth positioned in spaced relation about the periphery thereof, driving means positively and intermittently advancing said star wheel comprising, a cam wheel having a straight portion and a curved portion, spring means connected to said star wheel for resisting movement thereof by said cam wheel whereby contact between said cam wheel and only a single surface of a selected star wheel tooth is insured and means operated by the rotation of said cam wheel for preventing the application of undue spring pressure between said cam wheel and said star wheel teeth as said star wheel is advanced.

8. An intermittent movement comprising, a continuously rotating shaft, a cam wheel affixed to said shaft and rotated thereby, a star wheel attached to a second shaft having its axis disposed at an angle to the axis of said first mentioned shaft, said star wheel being provided with teeth uniformly spaced about the periphery thereof, said cam wheel being provided with a uniformly circular portion and an offset portion engaging selected ones of said star wheel teeth, a spring having one end fastened to said star wheel and the other end fastened to a gear rotatably mounted on said second shaft, a second gear attached to and rotated by said cam wheel, said first and second gears being operatively connected whereby rotation of said cam wheel reduces the tension applied to said spring, and an intermittent sprocket attached to said second shaft and rotated thereby.

EDWARD G. MERCIER.
ARTHUR F. HAYEK.

REFERENCES CITED

The following references are of record in the file of this patent:

UNITED STATES PATENTS

| Number | Name | Date |
|---|---|---|
| 401,512 | Oehlmann | Apr. 16, 1889 |
| 575,016 | Towne | Jan. 12, 1897 |
| 1,114,730 | Butcher | Oct. 27, 1914 |
| 1,129,754 | Storey | Feb. 23, 1915 |
| 1,279,909 | Reynolds | Sept. 24, 1918 |
| 1,368,763 | Schneider | Feb. 15, 1921 |
| 1,708,022 | Lorenz | Apr. 9, 1929 |
| 1,745,481 | Gilmore | Feb. 4, 1930 |
| 2,037,454 | Boecking | Apr. 14, 1936 |
| 2,332,509 | DeVry et al. | Oct. 26, 1943 |

FOREIGN PATENTS

| Number | Country | Date |
|---|---|---|
| 376,321 | Germany | May 26, 1923 |
| 93,221 | Austria | Jan. 15, 1927 |